United States Patent [19]

Tai

[11] Patent Number: 5,185,674
[45] Date of Patent: Feb. 9, 1993

[54] BINARY RESOLUTION DECIMATION METHOD AND APPARATUS

[75] Inventor: Hwai-Tzuu Tai, Greece, N.Y.

[73] Assignee: Eastman Kodak Company, Rochester, N.Y.

[21] Appl. No.: 862,941

[22] Filed: Apr. 3, 1992

[51] Int. Cl.$^5$ .............................................. H04N 1/40
[52] U.S. Cl. .................................................. 358/457
[58] Field of Search .............................. 358/426–427, 358/261.1–261.3, 456–457, 140; 382/56

[56] References Cited

U.S. PATENT DOCUMENTS

| | | | |
|---|---|---|---|
| 4,134,133 | 1/1979 | Teramura et al. | 358/261.2 |
| 4,667,251 | 5/1987 | Hasegawa | 358/457 |
| 4,760,460 | 7/1988 | Shimotohno | 358/261.2 |
| 4,970,586 | 11/1990 | Sunda et al. | 358/457 |

*Primary Examiner*—Stephen Brinich
*Attorney, Agent, or Firm*—Norman Rushefsky

[57] ABSTRACT

An apparatus and method are described for compressing data so that the data scanned in one resolution may be printed or displayed in a second resolution. The apparatus includes a buffer for storing a subset of data representing a matrix of n rows by m columns of data information. The data in the matrix is analyzed and a criterion for selection of a data-stitching locatin is made based upon the arrangement of data in the nxm matrix. The stitching location defines two adjacent rows that are to be stitched. A first shift register is provided for storing an intermediate n x(m−1) matrix of data. The buffer is connected to the first shift register from at least two rows in the buffer other than that of the two rows to be stitched, the shift register and shifting data in said two rows to be stitched by alternately switching between row selections to provide a zig-zag alternating data selection pattern. A second shift register is provided to store an (n−1)x(m−1) matrix of data. Data from the first shift register is shifted to the second shift register by shifting two columns of data into the second shift register means by shifting two columns of data into the second shift register and stitching two other columns of data in the first shift register means into one column of data in the second shift register by alternately switching between the two columns to be stitched so that data is sequentially shifted into said one column of said second shift register means by alternately selecting data from one column of said first shift register means and then selecting data from a different column of said first shift register means to generate an (n−1)x(m−1) matrix of compressed data.

32 Claims, 10 Drawing Sheets

BINARY RESOLUTION DECIMATION METHOD AND APPARATUS

BACKGROUND OF THE INVENTION

1. Field of the Invention

This invention relates, in general, to copying apparatus and methods and more specifically, to apparatus and methods which scan documents and convert the scanned signals into binary data for printing to form reproductions.

2. Description Relative to the Prior Art

In the electronic copying arts, an original image, such as on a document, is sampled periodically to produce a digital representation of the original image. The digital image is processed by applying image processing functions to improve such image qualities as sharpness and tone-scale. The processed digital image is then reproduced on an output medium such as photographic film or paper, a thermal-sensitive medium or otherwise reproduced on plain paper using an ink jet or an electrostatic printer. Examples of the latter may be electrophotographic printers which use laser or light-emitting diodes to form images on a photoconductive medium which is then toned and the toned images transferred to plain paper or a transparency. Typically, the image might be scanned at one resolution, say 400 dots per inch (d.p.i) and printed at a different resolution, say 300 d.p.i.

Where the input scanning resolution is not matched with the output printing resolution, the resolution conversion of data is necessary. Various resolution conversion methods are known in the prior art. However, the devices known in the prior art generally do not provide decimated images with good rendition because the decimation process does not take into account the type of data being decimated. For example, blocks of data representing thin or thick lines may not be distinguished during the decimation process.

It is therefore an object of the invention to provide an improved method and apparatus for decimation, i.e., compression, of binary data to match the decimated data with the resolution of the printer and which is adapted to provide enhanced rendition of line structure.

SUMMARY OF THE INVENTION

In accordance with the invention, there is provided apparatus for compressing binary data representing segments of characters and figures, the binary data being arranged in an n rows by m columns binary data matrix wherein n and m are each integers greater than 2, the method comprising the steps of:

determining rows that are to be stitched together into a second binary data matrix of smaller size wherein predetermined binary data in two selected rows of the nxm matrix is dropped in forming the matrix of smaller size; and stitching together signals representing binary data from two rows of the nxm matrix by selecting a data bit from one of the two rows in a first column, selecting a data bit from the other of the one of the two rows in a second column adjacent the first column, selecting a data bit from said one of the two rows in a third column adjacent the second column and dropping data bits in the two rows that are not selected.

BRIEF DESCRIPTION OF THE DRAWINGS

The invention and its advantages and uses will become more apparent when considered in conjunction with the following description and drawings, in which

FIG. 3b illustrates a 4×4 matrix in terms of density and corresponds to the matrix of binary data information of the matrix of FIG. 3a;

FIGS. 9a-9d are an illustration of the steps in the compression method of the invention on each of the 4×4 matrices in FIG. 8a and illustrates in FIG. 9e the resulting 6×6 data matrix equivalent to that of FIG. 8b;

DESCRIPTION OF THE PREFERRED EMBODIMENTS

Because reproduction apparatus are well known, the present description will be directed in particular to elements forming part of or cooperating more directly with the present invention. Apparatus not specifically shown or described herein are selectable from those known in the prior art. Throughout the following description, similar reference characters refer to similar elements or members in all of the figures of the drawings.

Figure 1:
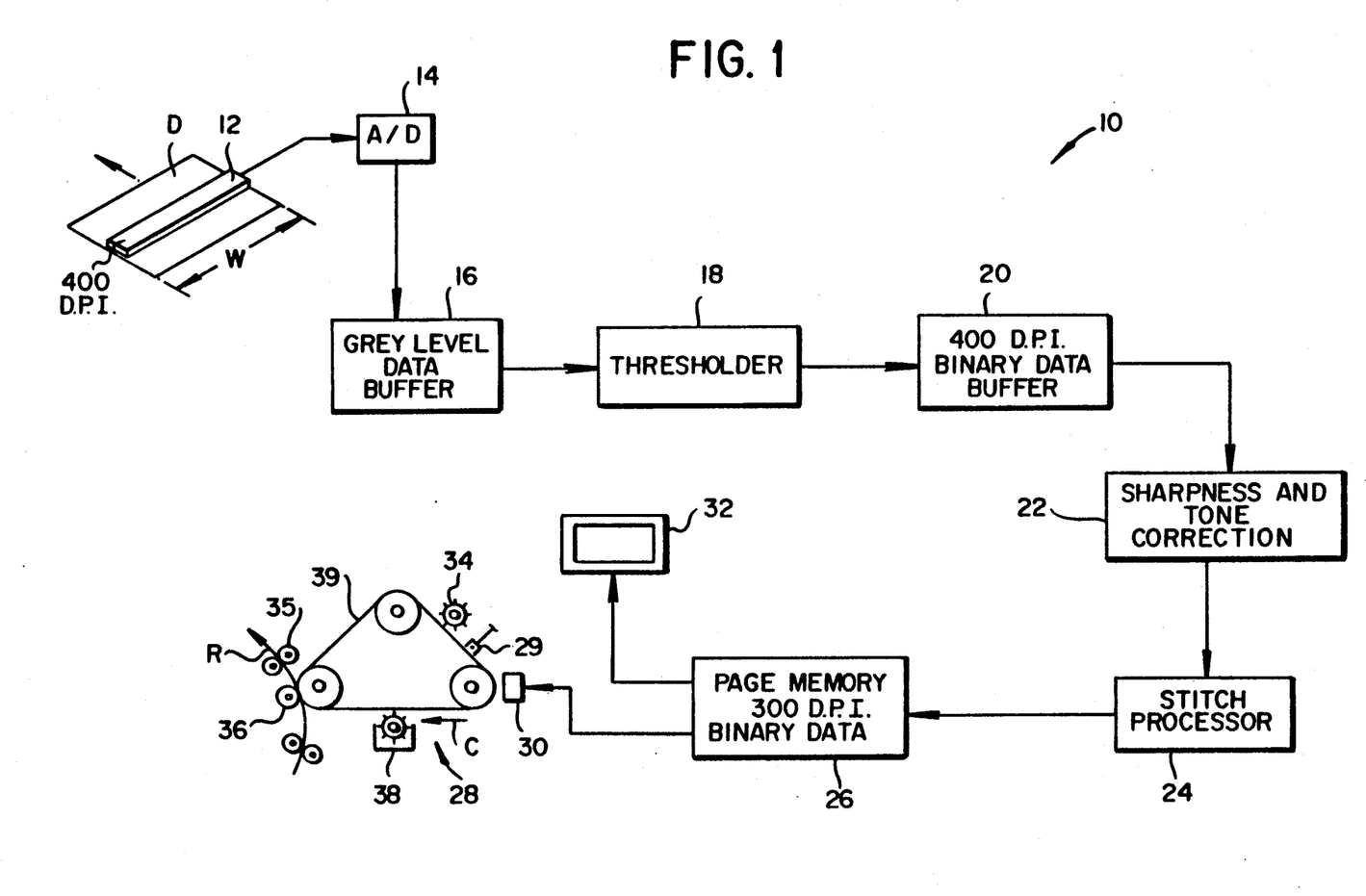
FIG. 1 is a schematic in block diagram form of a copying apparatus made in accordance with the apparatus of the invention.

Referring now to the drawings and to FIG. 1, in particular, there is shown a block diagram of a copy machine 10 utilizing the present invention. The scanner 12 is used to scan the original document and convert the optical information from the original document D to electrical signals. Typically, the scanner may comprise a charge-coupled device (CCD) that comprises a series of photosensors arranged in a row as the document original D is relatively moved in the direction of the arrow by conventional means and scanned in increments say along a narrow strip for the full width W of the document. Assume in this example that the sensors are arranged in a line and are adapted to scan simultaneously a row of pixels at a resolution of 400 d.p.i. on the document original. The row of data scanned is generated as a series of analog data representing the grey lvalue of each pixel scanned. This data is clocked out of the CCD registers and converted to an approximate equivalent digital signal by an analog-to-digital signal converter 14. The digital signal is then stored in a buffer 16. At this point each scanned pixel is stored as a multi-bit or grey level digital signal in the buffer. As an example, each pixel might be represented by 8 bits of data and data for several lines of pixels may be stored in the buffer 16. As the printer is a binary device, i.e., it either prints a pixel or dot at a location or it doesn't, the multi-bit data is required to be processed into a single or binary bit. A thresholding device or processor 18 is provided for this purpose. In its simplest form, the thresholding device includes known circuitry to process each pixel by comparing the grey level pixel value with a fixed threshold number and assigning one binary level to that pixel if the pixel value is above that number and assigning the other binary level to that pixel if the pixel value is say equal to or below that level. Other more sophisticated thresholding devices are known and include adaptive thresholders which change the threshold value in accordance with previous determinations or such threshold values may change randomly. In any event, a series of binary pixel data is generated by the thresholding device which may represent an approximation of the original image. At this point, or at some other point in the process, the data may be subjected to sharpness and/or tone correction or other correction to match the process characteristics of the print engine with the scanner and/or document scanned. The binary data at 400 d.p.i. resolution must now also be modified to 300 d.p.i. resolution to match the resolution of the print engine 28 or a display 32, such as a CRT or liquid crystal display. For example, the print engine 28 may comprise an LED printhead 30 that includes a single row of several thousand light-emitting diodes (LEDs) arranged at a pitch of 300 d.p.i. in a direction transverse to a moving photosensitive surface such as film, paper or a photoconductive web 39. The LEDs may be either selectively turned on or left off to expose or not to expose a corresponding area on the recording medium. The printhead may also be a laser or other type of printer such as ink jet, thermal, liquid crystal, etc.

The resolution decimation processing method of the invention will now be generally described with reference to the illustrations of FIGS. 2 and 3.

Figure 2A:
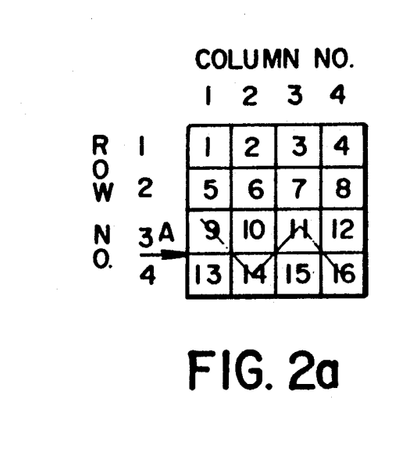
FIG. 2a illustrates a 4×4 matrix and identifies pixel data locations in the matrix and shows a zig-zag pattern for selecting data from two rows in accordance with the method of the invention.
Figure 2B:
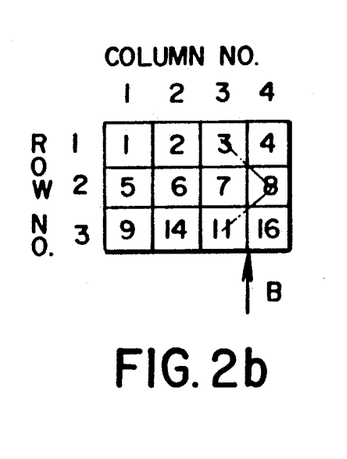
FIG. 2b illustrates a 4×3 intermediate matrix and shows the pixel data locations from the 4×4 matrix that are retained in the 4×3 matrix and further shows a zig-zag pattern for selecting data from two columns in accordance with the method of the invention.
Figure 2C:
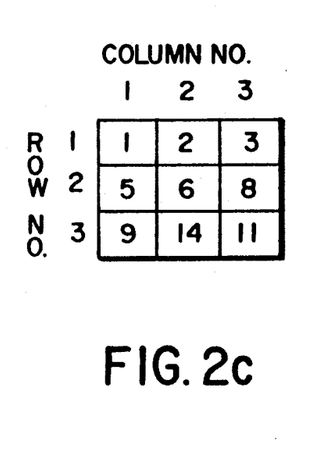
FIG. 2c illustrates a 3×3 matrix and shows the pixel data locations from the 4×4 matrix that are retained in the 3×3 matrix.
Figure 3A:
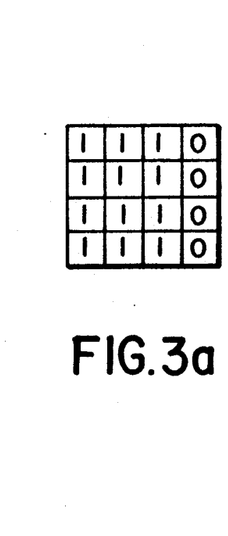
FIG. 3a illustrates a 4×4 matrix of binary data information.
Figure 3B:
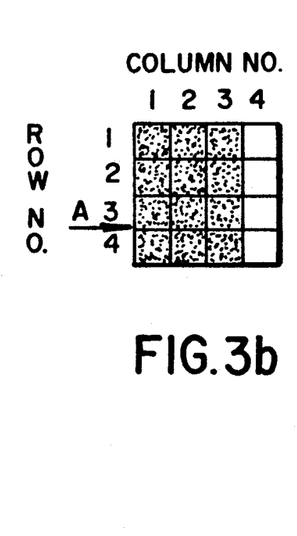
Figure 3C:
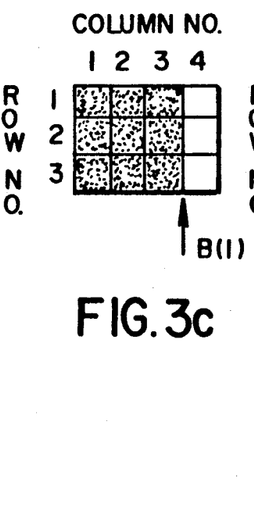
FIG. 3c illustrates a 4×3 intermediate matrix wherein two rows of pixels straddling the arrow A of the matrix of FIG. 3b are combined.
Figure 3D:
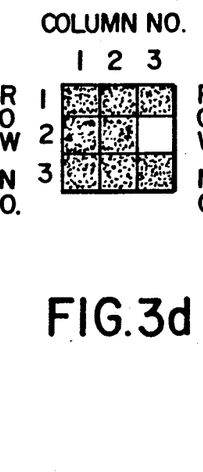
FIG. 3d illustrates a 3×3 matrix wherein two columns of pixels straddling the arrow B(1) of the matrix of FIG. 3c are combined.
Figure 3E:
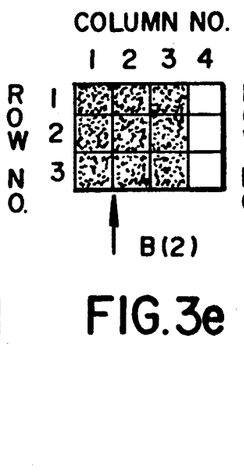
FIG. 3e illustrates the same intermediate 4×3 matrix of FIG. 3c.
Figure 3F:
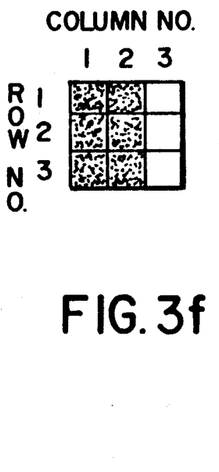
FIG. 3f illustrates a 3×3 matrix wherein two columns of pixels straddling the arrow B(2) of the intermediate matrix of FIG. 3e are combined.

With reference now to FIGS. 2a, a 4×4 original array block or matrix is illustrated and 16 pixel locations identified with numbers 1 through 16. The process for decimation of this 4×4 block into a 3×3 block (FIG. 2c) will now be described. In a first step, a decision is made as to which two of the four rows of pixel locations will be "stitched" together. As used herein the term "stitching" implies a joinder or uniting in accordance with a predetermined pattern for such joinder or uniting. As indicated by arrow A between the rows 3 and 4, the rows 3 and 4 are selected for stitching, whereas rows 1 and 2 are not selected. As can be seen in the illustration of the intermediate matrix of FIG. 2a, a zig-zag selection is made so that in the matrix of FIG. 2b pixel locations 9, 14, 11 and 16 of the matrix of FIG. 2a are retained in new row 3 whereas pixel locations 13, 10, 15 and 12 are eliminated. The invention also contemplates that the pixel locations 13, 10, 15 and 12 may be retained and the pixel locations 9, 14, 11 and 16 be eliminated. The intermediate 4×3 matrix is now subjected to a further zig-zag stitching process by combining the locations of two columns. As indicated by arrow B column numbers 3 and 4 are selected for stitching. As may be seen in FIG. 2b, the stitching of columns 3 and 4 retains pixel locations 3, 8 and 11 and eliminates pixel locations 4, 7 and 16. As indicated above, the order of zig-zagging may be changed to preserve pixel locations 4, 7 and 16 and eliminate locations 3, 8 and 11. However, for this example, it is preferred to preserve as many pixels as possible that were adjacent in the original 4×4 matrix. Thus, the 4×3 matrix is now reduced to a 3×3 matrix with selected original pixel locations illustrated in FIG. 2c. The process of FIGS. 2a-c will now be illustrated with reference to a hypothetical set of binary data. In FIG. 3a, a 4×4 matrix or array of binary data of 400 d.p.i. resolution is illustrated and is to be decimated to 300 d.p.i. by forming a 3×3 array of data from this 4×4 array. As an example, each binary 1 may indicate that the area corresponding to that location is to be dark, and a binary 0 indicates that an area corresponding to that location is to be light or background. Of course, the reverse could also occur. In a first step, a flag A is set indicating that the data of rows 3 and 4 are to be combined in the zig-zag fashion indicated in FIG. 2a. Thus, the intermediate 4×3 matrix of FIG. 3c features original data from rows 1 and 2 and stitched data of rows 3 and 4. The flag B(1) is now set and the data of columns 3 and 4 stitched together to provide the resulting 3×3 matrix of FIG. 3d which represents a block of 9 pixels that may be printed by the 300 d.p.i. printer. It will be understood that the size of the printed 3×3 print of pixel dots will be the same as the scanned 4×4 block of scanned dots from the original as the dots formed by the printer are larger than the corresponding pixel area sensed by each sensor in the scanner. FIGS. 3e-f illustrate the decimation of the same starting 4×4 pixel data array of FIG. 3b, but with a different choice of column flag location B(2) so that in the intermediate matrix of FIG. 3e, columns 1 and 2 are stitched together when processing from the 4×3 intermediate pixel data array to the resulting 3×3 pixel data array.

As is apparent from comparing FIGS. 3d and 3f, different decimated arrays result from different flag or stitching arrow locations and the preferred way of determining a flag location will now be described. With reference now to FIGS. 4a through 4h, various 4×4 data arrays are illustrated. For the array of FIG. 4a, each of the individual binary 1's indicate, a corresponding pixel location having density and the array itself represents a solid area of density. In processing this type of array, the stitching array locations will be located at the position described above for FIGS. 2a and 2b and these positions may be considered default positions; i.e., in the absence of any contrary instructions the operation of the stitch processor automatically defaults to these settings. FIG. 5a illustrates the corresponding 3×3 data set array produced by the stitch processor to the 4×4 data set array of FIG. 4a.

Figure 4A:
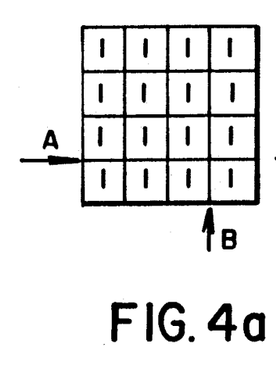
FIGS. 4a-4g illustrate 4×4 binary data matrices, each having data arranged in a pattern that is considered, in accordance with the invention, a pattern that is meaningful.
Figure 4B:
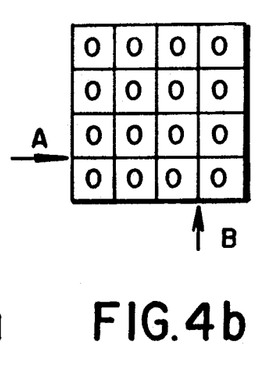
Figure 5A:
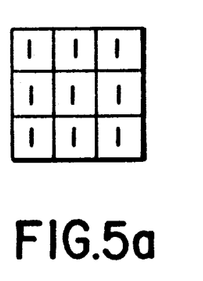
FIGS. 5a-5g' illustrate the resulting 3×3 binary data matrices produced by the stitch processor of the invention for the respective matrices of FIGS. 4a-g.
Figure 5B:
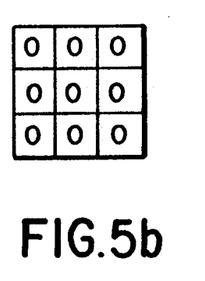

The data array of FIG. 4b represents an array without density. An array of data having this data set is also processed by the stitch processor using the default locations for the stitching arrows. FIG. 5b illustrates the data set array produced by the stitch processor for the 4×4 data set array of FIG. 4b.

Figure 4C:
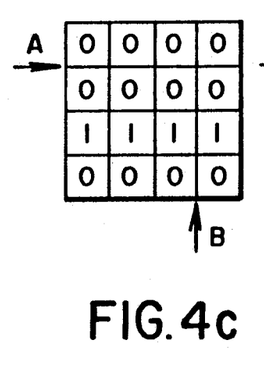
Figure 4D:
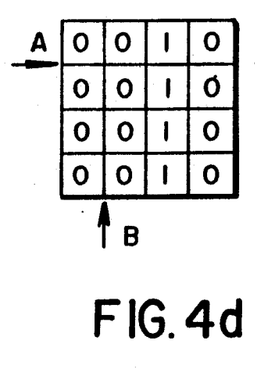
Figure 4E:
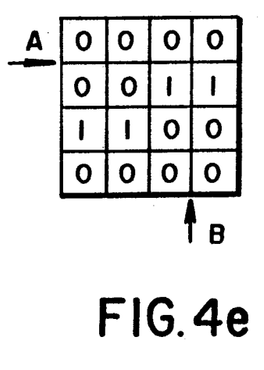
Figure 5C:
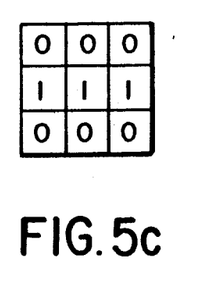
Figure 5D:
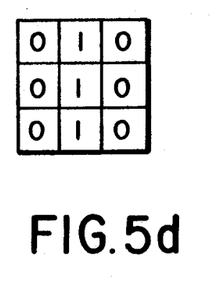
Figure 5E:
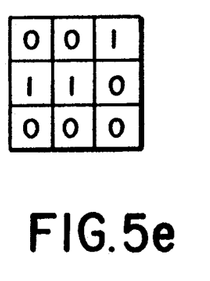

In FIGS. 4c, 4d and 4e, there are illustrated examples of 4×4 data set arrays representing thin lines. The stitching arrow locations are also illustrated and it will be noted that those arrows are chosen to be away from the thin lines. The 3×3 data set arrays corresponding to FIGS. 4c, 4d and 4e are illustrated in FIGS. 5c, 5d and 5e, respectively.

As can be seen, a judicious selection of stitching arrow location(s) can be used to preserve fine detail found in the original document.

Figure 4F:
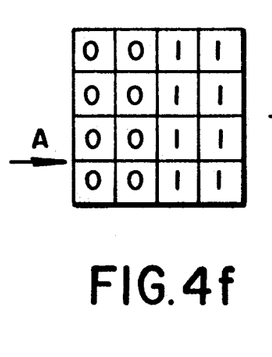
Figure 4G:
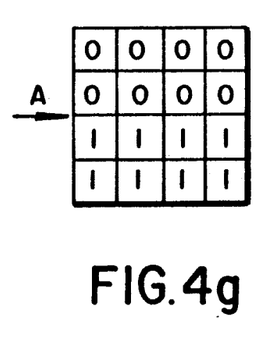
Figure 5F:
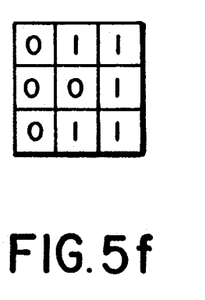
Figure 5G:
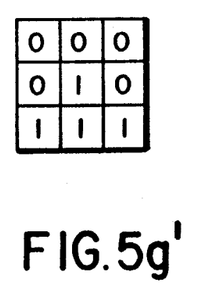

FIGS. 4f and 4g illustrate 4×4 data set arrays that represent a possible thick line. With such arrays, it is preferred to set the stitch location along the edge of the thick line. The resulting 3×3 data set array that is produced by the stitch processor is illustrated in FIGS. 5f and 5g, respectively. Further discussion relative to stitch processing of thick lines will be provided with reference to FIG. 10 to explain that there are two types of arrays resulting from thick lines as indicated by FIGS. 5g and 5g'.

In the above examples for FIGS. 4c–4g where the stitching arrow is selected for say stitching rows, the default selection will be operative for columns and vice versa. It will also be appreciated that only a few examples of data sets representing thin and thick lines are illustrated, but it will be apparent that other examples exist and may be treated according to the respective rules recited for thin and thick lines.

Figure 4H:
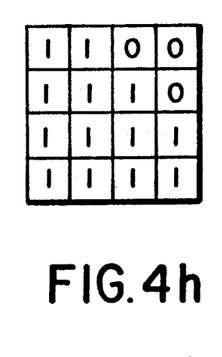
FIG. 4h illustrates a 4×4 binary data matrix that has data arranged in a pattern that is other than meaningful.
Figure 6:
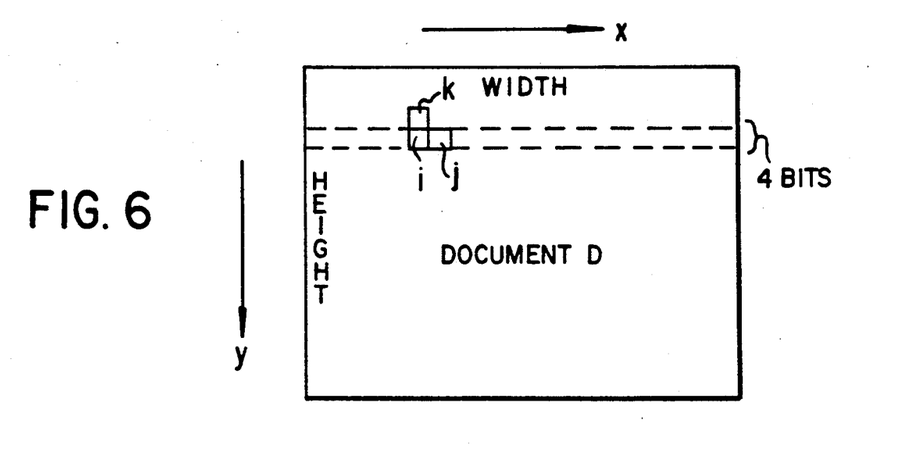
FIG. 6 illustrates a document original that is scanned by the apparatus of the invention and illustrates an area which is stored in a buffer register of a stitch processor for processing in accordance with the method of the invention.

In FIG. 4h, a data set array is illustrated as being an example of one which does not met the criteria of representing a solid black or solid white array or a thin or thick line. The treatment of a data set array not meeting this criteria is to have the locations of the stitching arrows remain at the respective locations for the stitching arrows that were used for the adjacent horizontal and vertical arrays. As may be seen in FIG. 6, the data bit array under consideration, i, has an adjacent data bit array, j, in the horizontal direction and an adjacent data bit array, k, the vertical direction. As used herein, "horizontal" relative to arrays implies that the arrays are in a current line undergoing stitch processing, whereas the term "vertical", relative to arrays implies arrays that are not in a current line undergoing stitch processing. Stitching location arrow positions have previously been determined for both the horizontally and the vertically adjacent arrays. These determinations or decisions are stored and used in making a determination or decision for the array, i, under consideration.

Figure 7:
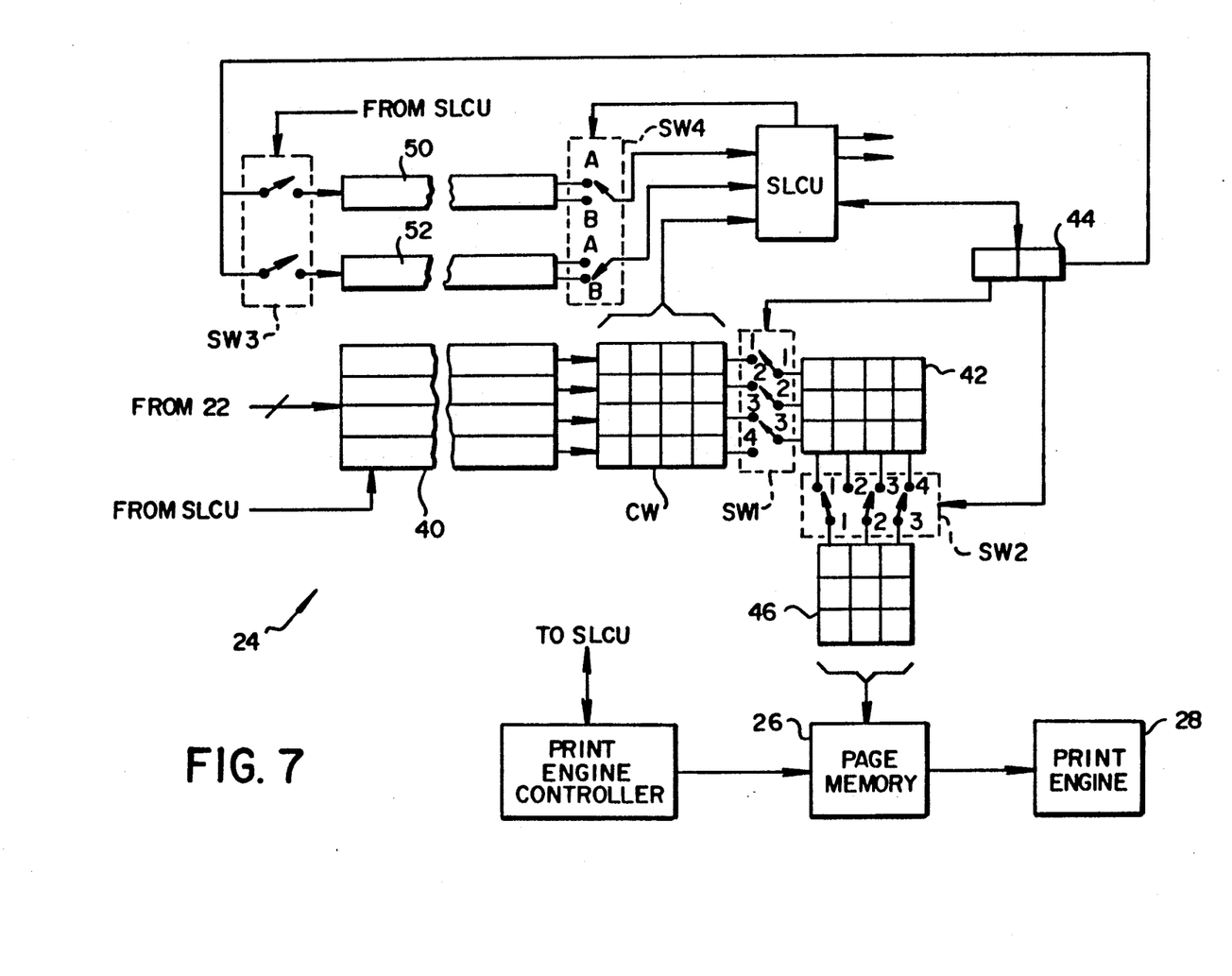
FIG. 7 illustrates in schematic block diagram form the stitch processor of a preferred embodiment of the invention.
Figure 8A:
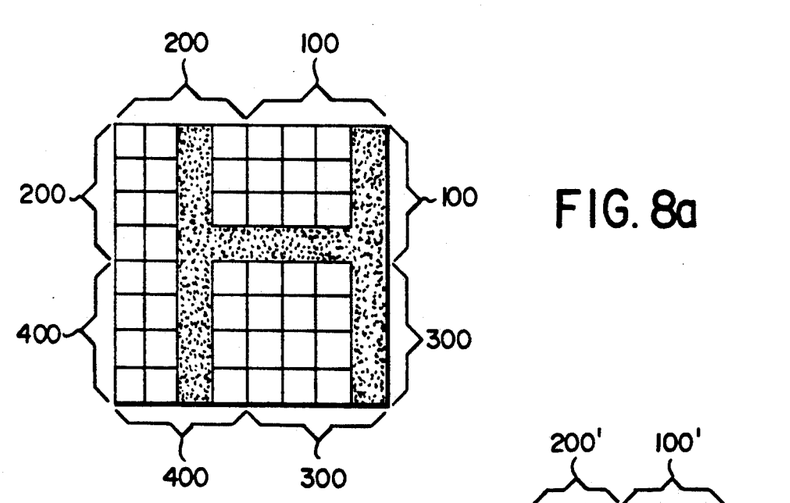
FIG. 8a illustrates an 8×8 dot matrix that is formed of a set of four 4×4 matrices.
Figure 8B:
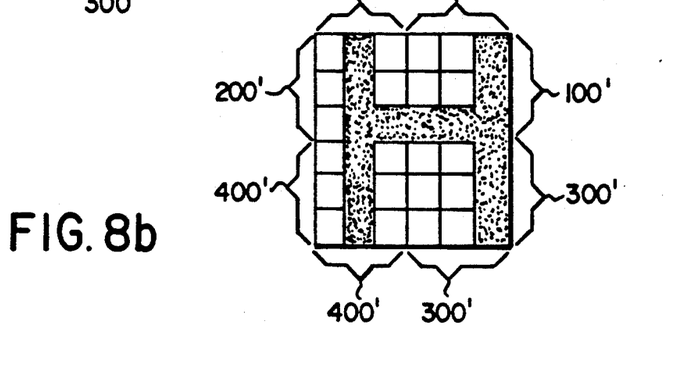
FIG. 8b illustrates a 6×6 dot matrix formed of four 3×3 matrices of which is formed by compressing the corresponding 4×4 matrix of FIG. 8a in accordance with the method of the invention.
Figure 9A:
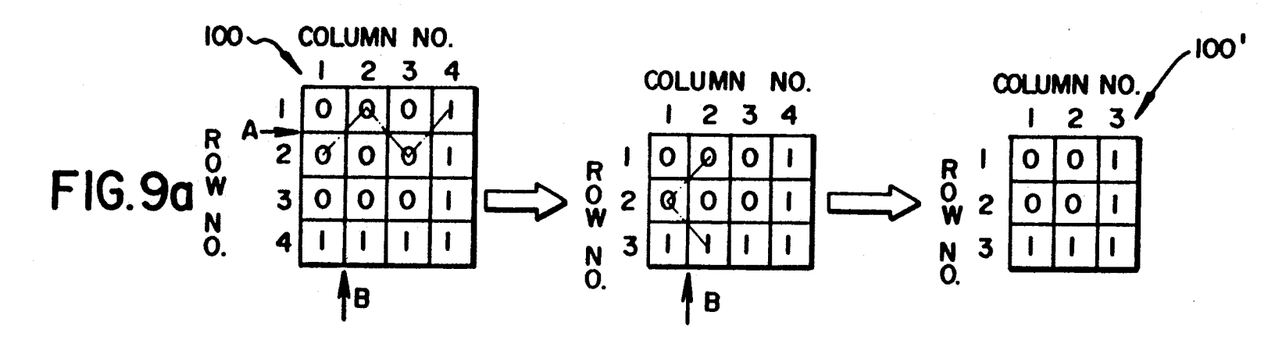
Figure 9B:
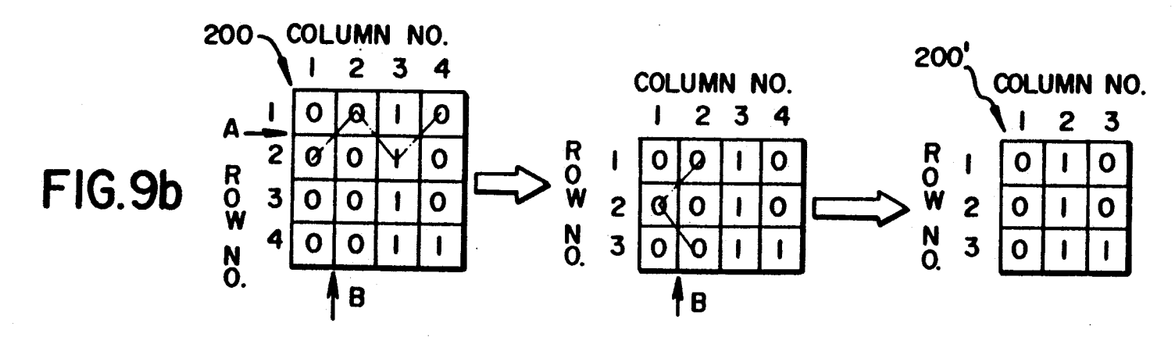
Figure 9C:
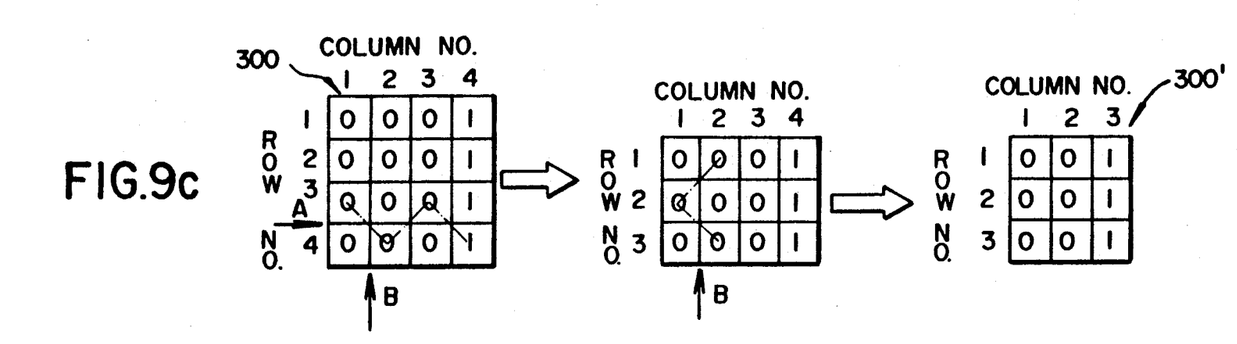

With reference to FIG. 8a, an 8×8 data bit array having the data bit set for the letter H is illustrated. In accordance with the decimation method and apparatus for the invention, the array is treated in sub blocks of 4×4 data bit arrays as follows. In FIG. 7, details in block diagram form of the stitching processor are illustrated. As may be seen from FIG. 7, the stitching processor includes a buffer shift register 40 which stores a complete width W of four lines high of binary bits. There may be several thousand CCD sensors arranged in a row across the width of document D so that a corresponding several thousand bits of data will be in each of the four lines. In response to clock signals from a stitch location control unit (SLCU), register 40 shifts 4×4 data bit arrays stored for these 4 lines of data serially into a terminal segment of the buffer which may be considered to be a window CW of the current 4×4 data bit array that is under consideration. The 4×4 data bit arrays in the current window is now processed by the stitch location control unit (SLCU). This control unit may include a microprocessor that is programmed in accordance with the flowchart illustrated in FIG. 10 to process the 4×4 bit arrays in accordance with the criteria set forth above or in lieu thereof it may comprise hard wired logic circuitry. Programming of such processors for the current application would be well within the skill of the art. Assume that a 4×4 data bit array 100 (FIG. 8a or equivalently FIG. 9a) is the array in the current window. The stitch location control unit recognizes this array as including two thin lines, one horizontal and one vertical. The criteria for operation determines that the stitching arrows for this array are away from the thin lines and are shown in FIG. 9a. The 4×4 data bit array 100 is then decimated into a 3×3 data bit array 100' as indicated in FIG. 9a. The apparatus 24 (FIG. 7) for generating the stitched array includes a three bit wide and 4-bit long shift register 42 that can selectively be connected to each of two rows of the shift register 40 storing the 4×4 data bit array in the working or current window CW. In the stitching process where two rows of data bits are combined, control signals from the stitch location control unit alternately couple, for example, shift register rows 1 and 2 of the current window register storing the 4×4 array to row 1 of the register 42. Thus, the row 1 register alternately receives the data bits one from row 1 and the next from row 2 in accordance with the stitching pattern as the data is serially clocked out of the window register CW storing the 4×4 array in response to clock pulses provided by the stitch location control unit and in response to the position of the switches SW1 that are activated in response to signals from the stitch location control unit which signals are based on the determination of stitching arrow locations. The switches may be logic gates receiving logic signals from a latch register 44 that stores each signal when output thereto from the SLCU. Subsequent to storage as an intermediate 4×3 array in the register 42, the 4×3 data bit array is then shifted into a shift register 46 that is three bits wide and three bits in length. The shifting is similarly made under the control of signals from the stitch control unit via latch 44 and selectively, through switches SW2, combines a predetermined pair of columns into one column in accordance with the criteria determined for the particular 4×4 data bit array. Subsequent to processing of the 4×4 data bit unit 100, the next horizontally adjacent data bit array 200 is processed and the processing for same is illustrated in FIG. 9b. Thereafter, the following 4×4 data bit arrays on this 4-bit wide line are processed until a column index that is periodically incremented after each 4×4 bit array is moved into the current window now indicates that the last 4×4 bit array for this line has been operated on. A new 4-bit high×document width line of data is then entered into the 4-bit high line buffer. As successive 4×4 data bit sets are shifted into the current window, eventually the column index will be the same value which indicated the 4×4 array 100. Thus 4×4 array 300 is now in the current window. As array 300 has the data bit pattern for a vertical thin line the stitching arrow location that is selected will be away from the thin line and identical with that determined for the 4×4 array 100. As may be seen in FIG. 7, the stitch location control unit outputs a determination of stitch arrow location not only as a data set tag to control the switches SW1 and SW2 but also stores signals representing the stitch arrow location determinations in shift registers 50, 52. Thus, determinations for each of the 4×4 arrays in the current line are stored in register 52 and the stitch arrow location determinations for the previous line are stored in shift register 50. As new lines of 4×4 data bit arrays are entered in the buffer-shift register 40, the registers 50, 52 switch so that the previous line register 50 becomes the current line register and register 52 becomes the previous line register. As may be seen in FIG. 7, switch banks SW3 responds to signals from SLCU to receive the appropriate data on stitch arrow determinations and switch bank SW4 controls the output of these registers in response to signals from the SLCU to control whether the SLCU receives a row or column arrow determination from a respective register 50, 52. After the array 300 is processed, the array 400 is also processed using the horizontal stitching arrow determined for array 300 and the vertical stitching arrow for array 200. The processing of array 400 is illustrated in FIG. 9d.

Figures 9D, 9E:
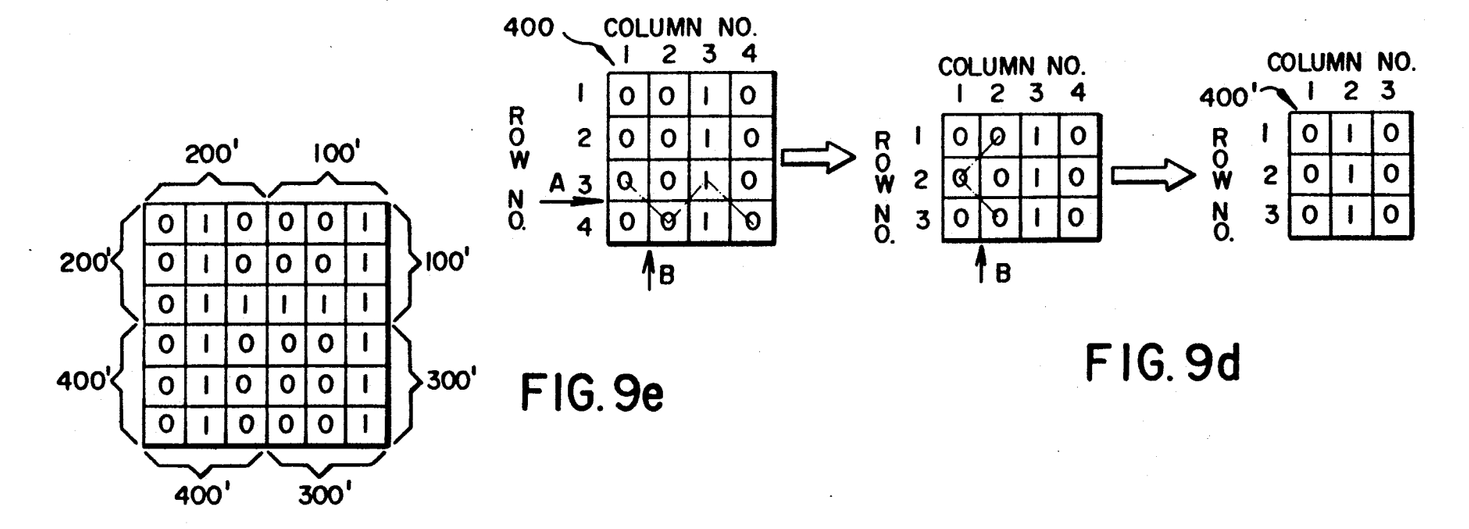

The remainder of the data on the original document is processed in accordance with the processing scheme set forth above and as may be seen in FIG. 9e, a 6×6 data bit array results that show reasonably good fidelity to the original 8×8 data bit array. The various 3×3 data bit arrays are stored in a read-write or RAM page memory 26 and output line by line (1 bit high lines×several thousand bits wide) to the binary LED printhead 28 for printing in accordance with well known techniques and apparatus. As may be seen in FIG. 1, the print engine 28 may include an LED printhead 30 having a row of LEDs arranged as single row transverse to movement of a photoconductor such as belt 39 that is driven in the direction indicated by the arrow C. The photoconductor is uniformly electrostatically charged by primary charger 29, the electrostatic charge on the belt is then modulated which exposure is responsive to the signals representing stitched data and output to the print engine from page memory 26. The modulated electrostatic engine is developed with visible toner particles at development station 38 and transferred at a transfer station to a sheet of say plain paper R to form a permanent record after fusing by fuser rollers 35.

Figure 10A:
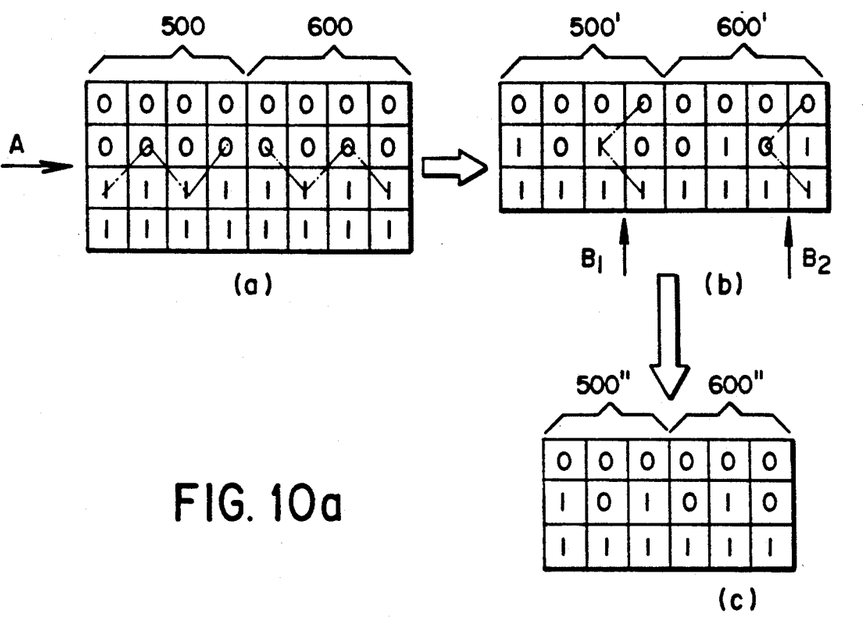
FIGS. 10a and 10b are alternative versions and each illustrate steps in stitching of data that has a pattern of a thick line and FIG. 11 is a flowchart of the operation of the stitching processor of the invention.
Figure 10B:
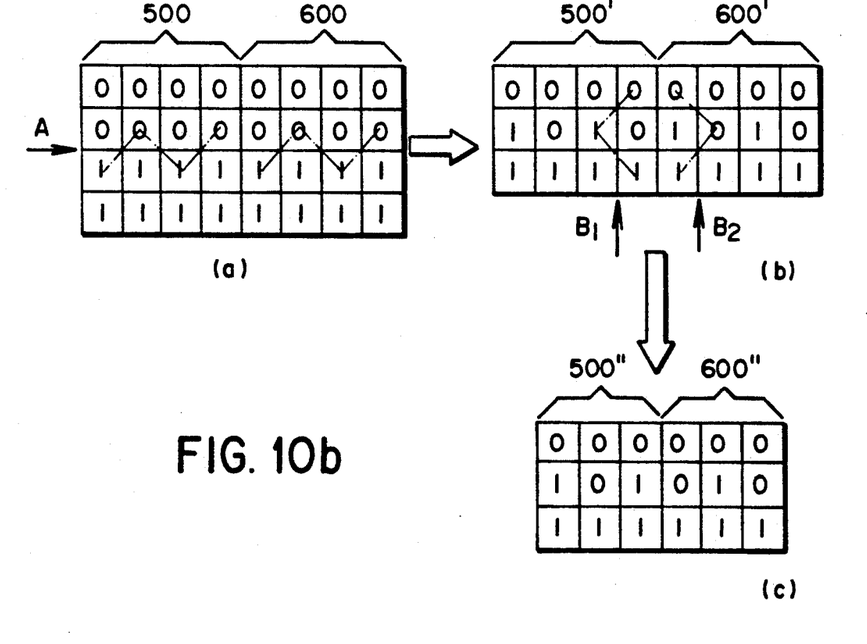
Figure 11:
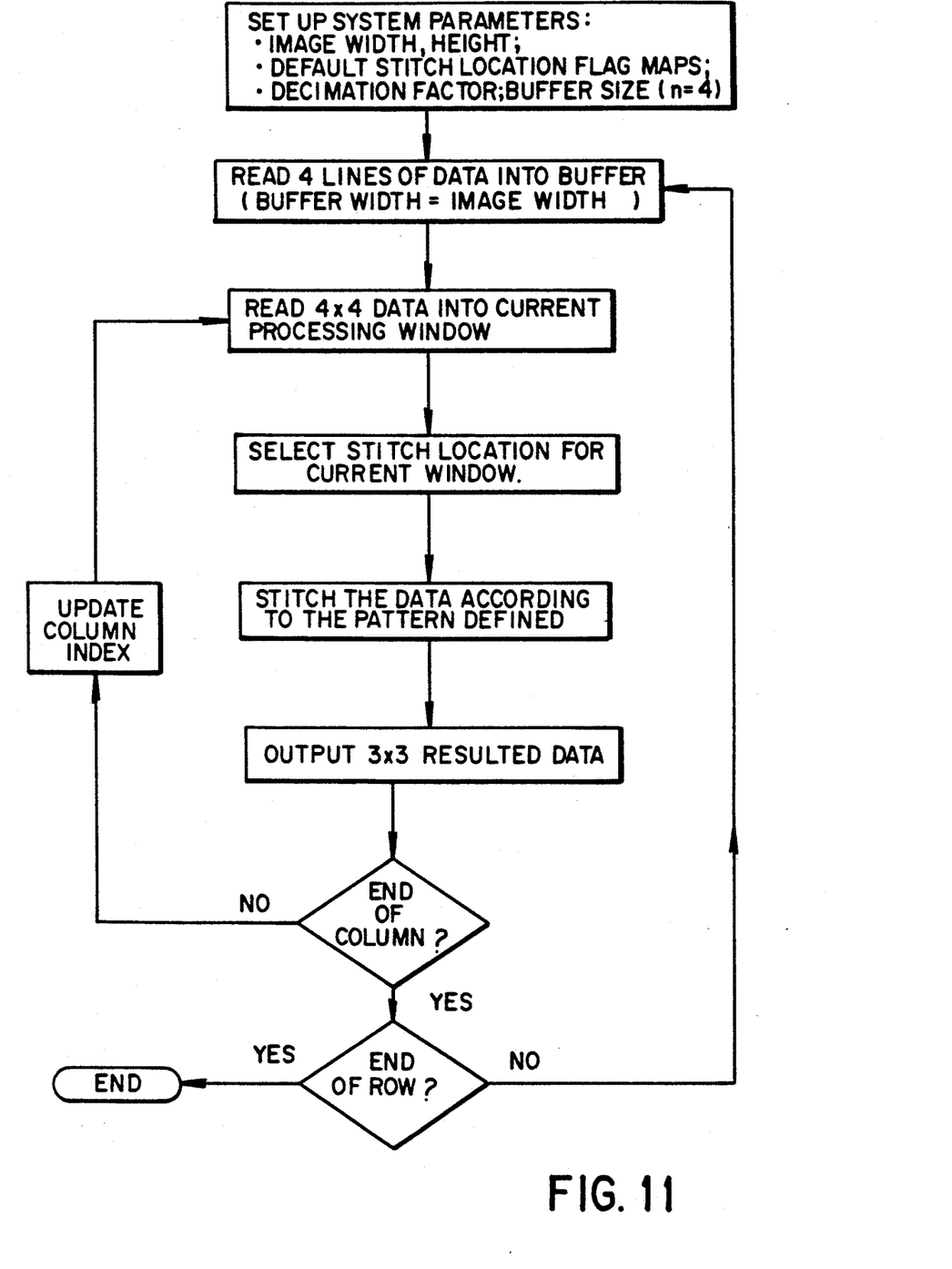

With reference to FIG. 10a, there is shown two 4×4 data arrays 500, 600 that are part of additional arrays of data that have a data pattern indicating a thick line. The arrow indicates the stitching location for transforming the 4×4 arrays shown in diagram (a) to the two 4×3 intermediate arrays 500', 600'. As may be seen, the shifting pattern alternates from the selection of data 1, 0, 1, 0 of array 500 to the selection of data 0,1,0,1 for array 600. The next array in line adjacent array 600 would again alternate to be identical with the data stitching shown for the array 500. The compression of the 4×3 arrays 500', 600' to that of the 3×3 arrays of 500'', 600'' shown in diagram (c) is made using the stitching schemes shown with regard to stitching arrows $B_1$ and $B_2$. However, the stitching pattern is the same for array 500' and 600' but because of differences in data in each array, the data selected from array 500' are 0, 1, 1 whereas for array 600', the data selected are 0,0,1. As may be seen in diagram (c) the resulting 3×3 arrays 500'', 600'' simulate a thick line with the horizontal central row of data featuring a 1,0,1,0 ... etc. on-off-on pattern. The pattern of diagram (c) may also be achieved as shown in FIG. 10b using the stitching pattern shown for array 500 and using the same stitching pattern for array 600 as used for 500 and then shifting the stitching arrow $B_2$ to a different column. The SLCU may be programmed to recognize strings of arrays representing thick lines and change the stitching process for adjacent arrays as is illustrated in the examples of FIGS. 10a and 10b.

There has thus been described an improved data decimation process and apparatus which provides a relatively simple procedure and apparatus for data decimation required for printing with lower resolution printers when providing data inputs from higher resolution data sets.

As used herein, the width or height orientation of "rows" and "columns" are arbitrary and may be reversed from that used herein. Also, although the decimation process is illustrated as a step process wherein there is created an intermediate matrix a stitch processor may use an algorithm for directly outputting a decimated matrix in response to an input matrix without creating the intermediate by, for example, comparing look-up tables in memory. The invention has been illustrated with reference to compression of 4×4 arrays to 3×3 but obviously is not limited to only such arrays. Thus, 5×5 arrays equivalent to say an input resolution of 600 d.p.i may be converted to 4×4 arrays-480 d.p.i. output resolution. Or 3×3 arrays equivalent to say a 600 d.p.i. input resolution may be converted to a 2×2 array of 400 d.p.i. output resolution. The invention is thus directed to compression of arrays of binary data of n columns by m rows wherein n and m are each integers greater than 2 to form a compressed array of binary data of dimension pxq wherein p and q are each integers greater than 1.

The invention has been described in detail with particular reference to a preferred embodiment thereof, but it will be understood that variations and modifications can be effected within the spirit and scope of the invention as described hereinabove and as defined in the appended claims.

I claim:

1. A method of compressing binary data representing segments of characters and figures, the binary data being arranged in an n rows by m columns binary data matrix wherein n and m are each integers greater than 2, the method comprising the steps of:
   determining rows that are to be stitched together into a second binary data matrix of smaller size wherein predetermined binary data in two selected rows of the nxm matrix are dropped in forming the matrix of smaller size; and stitching together signals representing binary data from the two rows of the nxm matrix by selecting a data bit from one of the two rows in a first column, selecting a data bit from the other of the one of the two rows in a second column adjacent the first column, selecting a data bit from said one of the two rows in a third column adjacent the second column and dropping from the two rows data bits that are not selected.

2. The method of claim 1 and including the step of stitching together signals representing binary data from two columns of an intermediate matrix formed from the nxm matrix by selecting a data bit from the one of two columns in a first row of the intermediate matrix, selecting a data bit from the other of the one of the two columns in a second row adjacent the first row, selecting a data bit from said one of the two columns in a third row adjacent the second row and dropping from the two columns data bits that are not selected to form a compressed matrix of binary data of dimension pxq wherein p and q are each integers greater than 1.

3. The method of claim 2 and including the step of storing signals representing the pxq matrix in a read-write memory.

4. The method of claim 3 and including the step of printing the binary data stored in the pxq matrix.

5. The method of claim 1 and including the step of printing stitched data.

6. The method of claim 1 and including the step of analyzing the data in the nxm matrix to determine if it meets a criteria for a thick line and if it meets this criteria stitching together a row of data representing a boundary of density and an adjacent row of data representing a boundary of background to the boundary of density.

7. The method of claim 6 and including the step of storing signals representing the stitched data in a read-write memory.

8. The method of claim 7 and including the step of printing stitched data.

9. The method of claim 8 and including the step of scanning an original document and generating in response to the scanning binary data signals representing information on the original, and storing the binary information in a memory.

10. The method of claim 4 and including the step of scanning an original document and generating in response to the scanning binary data signals representing information on the original and storing the binary information in a memory.

11. The method of claim 1 and including a step of setting a flag to determine two rows that are to be stitched together.

12. The method of claim 6 and including a step of setting a flag representing the boundary location to determine two rows that are to be stitched together.

13. The method of claim 2 and including a step of setting a flag to determine two rows that are to be stitched together.

14. The method of claim 4 and including a step of setting a flag to determine two rows that are to be stitched together.

15. A method of reproducing data on an original document, the method including the steps of:

(a) scanning a document at a first resolution to generate first signals representing information on the document;

(b) in response to said first signals generating second signals representing sets of data in said first resolution;

(c) analyzing the data in a set that comprises a matrix of n rows by m columns of data to determine a pair of rows in said matrix that are to be stitched together and generating a third signal identifying the pair of rows and wherein n and m are each integers greater than 2;

(d) selecting data in said two rows by applying a zig-zag selection pattern to determine the selected data and generating fourth signals representing a matrix of different resolution than said nxm matrix that includes only data found in said nxm matrix but is missing nonselected data from said nxm matrix; and (e) in response to said fourth signals generating fifth signals that provide a reproduction of the information on the original document.

16. The method of claim 15 and wherein the fifth signals are transmitted to a printing device for printing a reproduction of the original document.

17. The method of claim 15 and wherein the fifth signals are used to display a reproduction of the original document.

18. An apparatus for reproducing data on an original document, the apparatus comprising:

(a) means for scanning a document at a first resolution to generate first signals representing information on the document;

(b) means responsive to said first signals for generating second signals representing data in said first resolution;

(c) means for analyzing a matrix of data to determine a pair of rows of data in said matrix that are to be stitched together and for generating a third signal identifying the pair of rows;

(d) means for selecting data in said two rows by applying a zig-zag selection pattern to determine the selected data and generating fourth signals representing data of different resolution than said matrix that includes only data found in said matrix but is missing nonselected data from said matrix; and (e) means responsive to said fourth signals for generating fifth signals that provide a reproduction of the information on the original document.

19. The apparatus of claim 18 and including a printing device that is responsive to the fifth signals for printing a reproduction of the original document.

20. The apparatus of claim 18 and including a display means that is responsive to the fifth signals for displaying a reproduction of the original document.

21. A method for compressing data, the method comprising the steps of:

(a) storing in a buffer a subset of the data, the subset of data representing a matrix of n rows by m columns of data information, wherein n and m are each integers greater than 3;

(b) analyzing the data in the matrix and applying a criterion for selection of a stitching location based upon the arrangement of data in said nxm matrix;

(c) generating a first signal representing a stitching location that defines two adjacent rows that are to be stitched;

(d) in response to said first signal connecting said buffer to a first shift register for storing three rows of data and shifting data from at least two rows in said buffer other than that in said two rows to be stitched to said shift register and shifting data in said two rows to be stitched by alternately switching between row selection to provide a zig-zag alternating selection pattern so that the data stored in said shift register is an n x(m−1) matrix of data; and (e) shifting said data from said first shift register to a second shift register by shifting two columns of data into said second shift register and stitching two other columns of data from said first shift register into one column of data in said second shift register by alternately switching between the two columns to be stitched so that data is sequentially shifted into said one column of said second shift register by alternately selecting data from one column of said two columns to be stitched and then selecting data from the other column of said two columns to be stitched to generate an (n−1)x(m−1) matrix of compressed data.

22. The method of claim 21 and including the step of printing the compressed data.

23. The method of claim 21 and including the step of storing a signal representing a stitching location and used to stitch the matrix and recalling the latter signal for use in determining a stitching location for an adjacent matrix.

24. The method of claim 23 and wherein signals representing stitching locations are stored for matrices of data on a current line of data and a previous line of data.

25. An apparatus for compressing data, the apparatus comprising:

(a) buffer means for storing a subset of data representing a matrix of n rows by m columns of data information wherein n and m are each integers greater than 3;

(b) means for analyzing the data in the matrix and applying a criterion for selection of a stitching location based upon the arrangement of data in said nxm matrix;

(c) means for generating a first signal representing a stitching location that defines two adjacent rows that are to be stitched;

(d) first shift register means for storing an n x(m−1) matrix of data;

(e) means responsive to said first signal for connecting said buffer means to said first shift register means for shifting data from at least two rows in said buffer means other than that of said two rows to be stitched, to said first shift register means and shifting data in said two rows to be stitched by alternately switching between row selections to provide a zig-zag alternating data selection pattern;

(f) second shift register means for storing an (n−1)x(m−1) matrix of data; and (g) means for shifting data from said first shift register means to said second shift register by shifting two columns of data into said second shift register means by shifting two columns of data into said second shift register means and stitching two other columns of data in said first shift register means into one column of data in said second shift register means by alternately switching between the two columns to be stitched so that data is sequentially shifted into said one column of said second shift register means by alternately selecting data from one column of said first shift register means and then selecting data from a different column of said first shift register means to generate an (n−1)x(m−1) matrix of compressed data.

26. The apparatus of claim 20 and including a printer means for printing the compressed data.

27. The apparatus of claim 25 and including means for storing a signal representing a stitching location used to stitch the matrix and for recalling the latter signal for use in determining a stitching location for an adjacent matrix.

28. The method of claim 25 and including means for storing signals representing stitching locations for matrices of data on a current line of data and a previous line of data and for recalling stitching locations used in determining stitching locations for adjacent horizontal and vertical matrices of a matrix being currently analyzed.

29. An apparatus for compressing binary data representing segments of characters and figures, the binary data being arranged in an n rows by m columns binary data matrix wherein n and m are each integers greater than 2, the apparatus comprising:

means for determining rows that are to be stitched together into a second binary data matrix of smaller size by dropping predetermined binary data in selected rows of the nxm matrix; and means for stitching together signals stored in a memory and representing binary data from two rows of the nxm matrix by selecting a data bit from one of the two rows in a first column, selecting a data bit from the other of the one of the two rows in a second column adjacent the first column, selecting a data bit from said one of the two rows in a third column adjacent the second column and dropping data bits in the two rows that are not selected.

30. The apparatus of claim 29 and including means for stitching together signals representing binary data from two columns of an intermediate matrix formed from the nxm matrix by selecting a data bit from one of two columns in a first row of the intermediate matrix, selecting a data bit from the other of the one of the two columns in a second row adjacent the first row, selecting a data bit from said one of the two columns in a third row adjacent the second row and dropping data bits in the two columns that are not selected to form a compressed matrix of binary data of dimension pxq wherein p and q are each integers greater than 1.

31. The apparatus of claim 30 and including means for storing signals representing the pxq matrix in a read-write memory.

32. The apparatus of claim 31 and including means for printing the binary data stored in the pxq matrix.

* * * * *